Dec. 17, 1940. G. A. WALKER 2,225,327
TOOLHOLDER
Filed Oct. 7, 1939
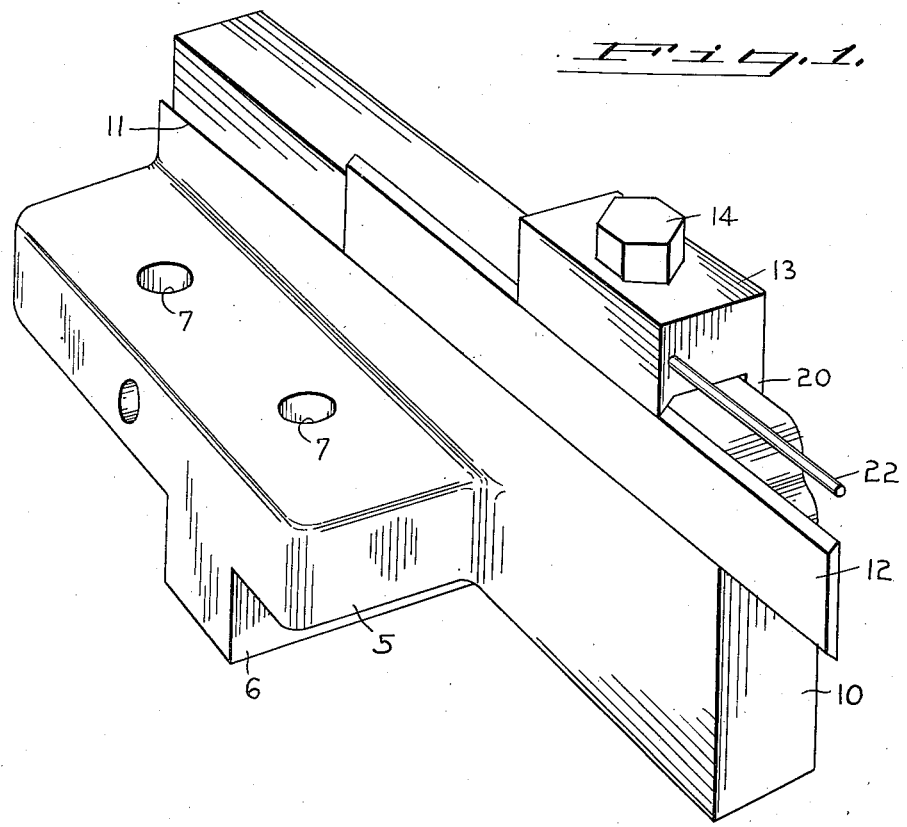
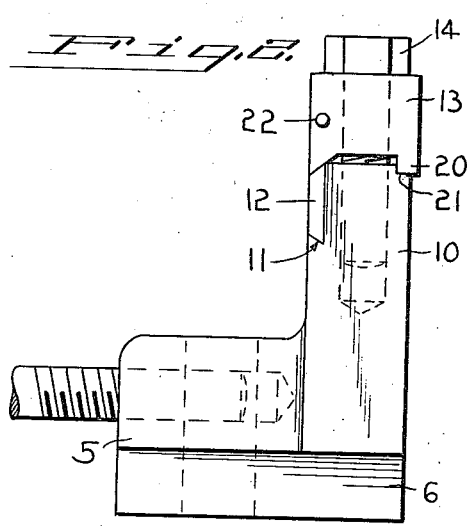
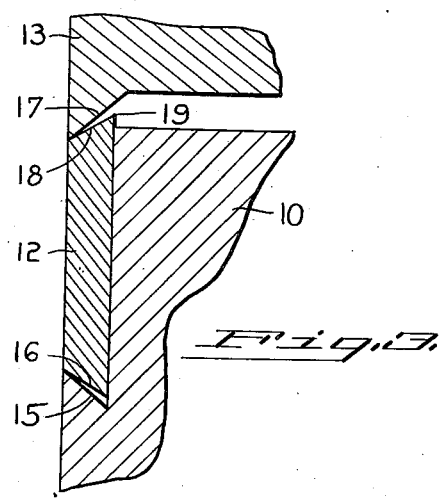
INVENTOR.
George A. Walker
BY Geo. A. Senior
ATTORNEY.

Patented Dec. 17, 1940

2,225,327

UNITED STATES PATENT OFFICE 2,225,327

TOOLHOLDER

George A. Walker, Arlington, N. J., assignor to Pollak Manufacturing Company, Arlington, N. J., a corporation of New Jersey Application October 7, 1939, Serial No. 298,368

1 Claim. (Cl. 29—96)

The invention relates to toolholders and more particularly to the type of toolholder used for holding a cut off blade used on screw machine.

Tools and toolholders in this class of work are subject to excessive strains, particularly where the stock being worked in is of large diameter, and the cut must be made with the greatest of precision. It is therefore essential that the toolholder be very strong and rugged in construction and that it function to support the tool with absolute accuracy and rigidity.

It is also important to provide a toolholder in which the tool may be easily and quickly positioned. This saves considerable time when the tool has to be removed for dressing or sharpening or when setting the machine up for a new job. As machines of the type on which the holder is used are highly expensive all operating time saved is of real account.

In addition to the foregoing other objects and advantages will become apparent as this specification proceeds. Referring to the drawing forming a part thereof and in which a preferred embodiment of the invention is illustrated:

Fig. 1 is a perspective view of the toolholder with a blade in position;

Fig. 2 is an end view; and

Fig. 3 is a fragmentary detail sectional view on a larger scale.

Referring again to said drawing the toolholder is angle shaped in cross section for a substantial part of its length. The horizontal leg 5 of the toolholder provides a substantial broad heavy base. The base has the guide key 6 and one or more openings 7 to accommodate suitable bolts for maintaining the toolholder in position on the screw machine. The usual adjusting screw 8 is also provided.

The vertical leg 10 has a longitudinally extending seat 11 for the cut off blade or tool 12. The cut off blade is held in position by a retaining block 13 which is secured to the top of the vertical leg at its forward portion by a bolt 14. The cut off blade is thus rigidly and firmly secured in position in a region close to where the work is being performed and it will be apparent the tool may be easily and quickly removed or replaced.

It will be noted the longitudinally extending seat is undercut as indicated at 15. The cut off blade 12 has its lower edge beveled as indicated at 16. The angle of the undercut portion is greater than the angle of the bevel. The retaining block 13 has an angularly disposed edge 17 and the angle of this edge is greater than the angle of the bevel 18 in the upper edge of the blade.

The foregoing arrangement in addition to making for a most efficient means for firmly gripping the blade functions to protect the edge 19 which is the cutting edge of the blade.

To more effectively position the retaining block 13 it is provided with a longitudinally extending lip 20 which engages a longitudinally extending notch or cutout 21 on the blade support.

The retaining block has a pin 22 extending forwardly therefrom and in vertical alignment with the blade. This pin functions to contact the finished up screw machine part that is being cut off and prevent it from canting when the metal is weakened just prior to the cut being completed.

Such changes in details of construction and arrangements of parts as might be made by one skilled in the art are to be considered as coming within the spirit of the invention as set forth in the appended claim.

I claim:

A toolholder angle shaped in cross section for a substantial part of its length, the horizontal leg of the angle constituting a heavy base which is adapted to be secured to the machine, and the vertical leg having a longitudinally extending seat for a cut off blade, and a retaining block for holding said blade in position, said retaining block being secured to the top of the vertical leg at the forward portion thereof, the bottom of said longitudinally extending seat being undercut to accommodate a bevel on the lower edge of the blade, the angle of the undercut portion being greater than the angle of the bevel of the blade, and the retaining block having an angularly disposed edge to accommodate a bevel on the upper edge of the blade, the angle on the edge of the retaining block being greater than the angle of the bevel of the blade, and a pin extending forwardly from said retaining block, the pin being in vertical alignment with the blade.

GEORGE A. WALKER.